(12) United States Patent
Lin et al.

(10) Patent No.: US 7,675,264 B2
(45) Date of Patent: Mar. 9, 2010

(54) CHARGING AND POWER-SUPPLY DEVICE

(75) Inventors: Mei-Ju Lin, Chung Ho (TW);
Ming-Chou Kuo, Chung Ho (TW);
Jung-Hui Hsu, Chung Ho (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 365 days.

(21) Appl. No.: 11/798,057

(22) Filed: May 10, 2007

(65) Prior Publication Data
US 2008/0224660 A1 Sep. 18, 2008

(30) Foreign Application Priority Data
Mar. 15, 2007 (TW) .............................. 96108896 A

(51) Int. Cl.
*H01M 10/46* (2006.01)
(52) U.S. Cl. ...................................................... 320/115
(58) Field of Classification Search ................. 320/107, 320/112, 114, 115
See application file for complete search history.

(56) References Cited

U.S. PATENT DOCUMENTS

| | | | | |
|---|---|---|---|---|
| 5,621,299 A | * | 4/1997 | Krall | 320/103 |
| 5,822,185 A | * | 10/1998 | Cavello | 361/679.42 |
| 5,852,353 A | * | 12/1998 | Kochanneck | 318/558 |
| 2004/0061996 A1 | * | 4/2004 | Kamphuis et al. | 361/683 |
| 2005/0007066 A1 | * | 1/2005 | Long et al. | 320/107 |

* cited by examiner

*Primary Examiner*—Edward Tso
(74) *Attorney, Agent, or Firm*—Rosenberg, Klein & Lee

(57) ABSTRACT

A charging and power-supply device includes a base, at least one power socket, a board located on the base, and a conductive wire. The power socket is located on the base. The board is rotatably pivoted with the base via a pivoting unit. The conductive wire is electrically connected with the power socket. When the board is rotated above the base, the board is on a slope. It is convenient to place the portable device on the board to charge the portable device. There is a receiving space formed between the board and the base for receiving the wire of the portable device. When the board is rotated below the base, the board is stacked and placed under the base to reduce the occupied space when the charging and power-supply device is shipped or packaged.

13 Claims, 4 Drawing Sheets

CHARGING AND POWER-SUPPLY DEVICE

BACKGROUND OF THE INVENTION

1. Field of the Invention

The present invention relates to a charging and power-supply device. In particular, this invention relates to a charging and power-supply device that supplies power to portable devices.

2. Description of the Related Art

Portable devices, such as laptops, cell phones, and MP3 players, etc, can be placed on a charging device to be charged for supplying their required power. Charging devices of the prior art include a base and a cover. When the portable device needs to be charged, the cover is opened and the portable device is placed into the base for charging. Taiwan patent M243841, issued on 11, Nov. 2004, discloses such a portable charging base.

Because the dimensions of the base and the cover of the charging device are large, a large amount of space is occupied when the charging device is shipped. Moreover, the charging device does not provide a space for receiving the wires of the portable device. It is inconvenient.

SUMMARY OF THE INVENTION

One particular aspect of the present invention is to provide a charging and power-supply device. A board is located above the base to form a slope. The portable device is placed on the board for charging, and the wire of the portable device is received. The board can be stacked onto the base to reduce the occupied space when the charging and power-supply device is being shipped or packaged.

The charging and power-supply device includes a base, at least one power socket located on the base, a board located on the base, and a conductive wire electrically connected with the power socket. When the board is placed above the base, the board is a slope. There is a receiving space formed between the board and the base for receiving the conductive wire. When the board is not being used, the board is stacked onto the base.

The charging and power-supply device can be placed on a table, and the board is placed above the base to form a slope. It is convenient to place the portable device on the board, and the plug of the portable device plugs into the power socket for charging. When the board is on a slope, there is a receiving space formed between the board and the base for receiving the conductive wire. Therefore, the wire of the portable device is received in the receiving space. The board also can be stacked onto the base to reduce the occupied space when the charging and power-supply device is being shipped or packaged.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
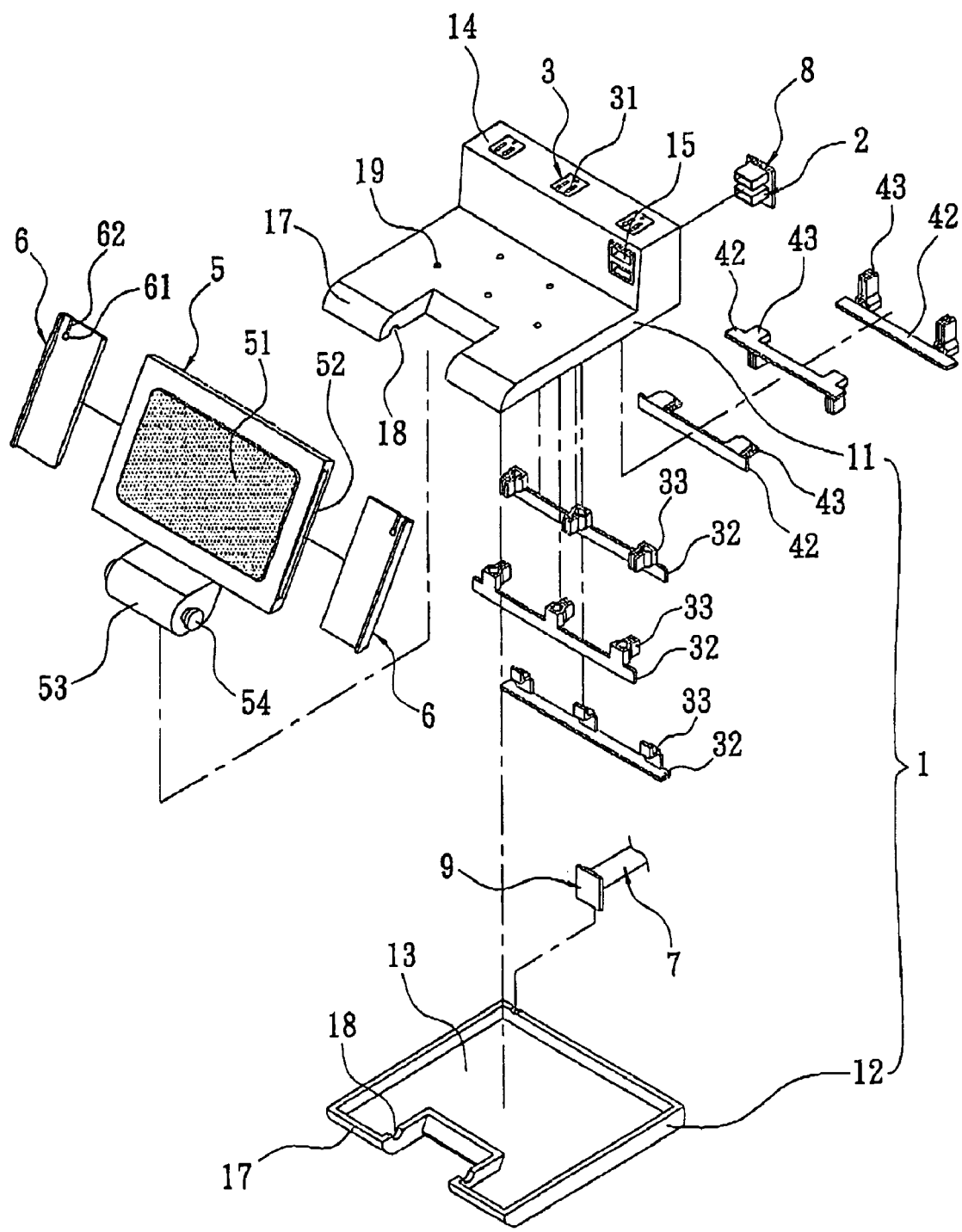
FIG. 1 is an exploded perspective view of the charging and power-supply device of the present invention.
Figure 2:
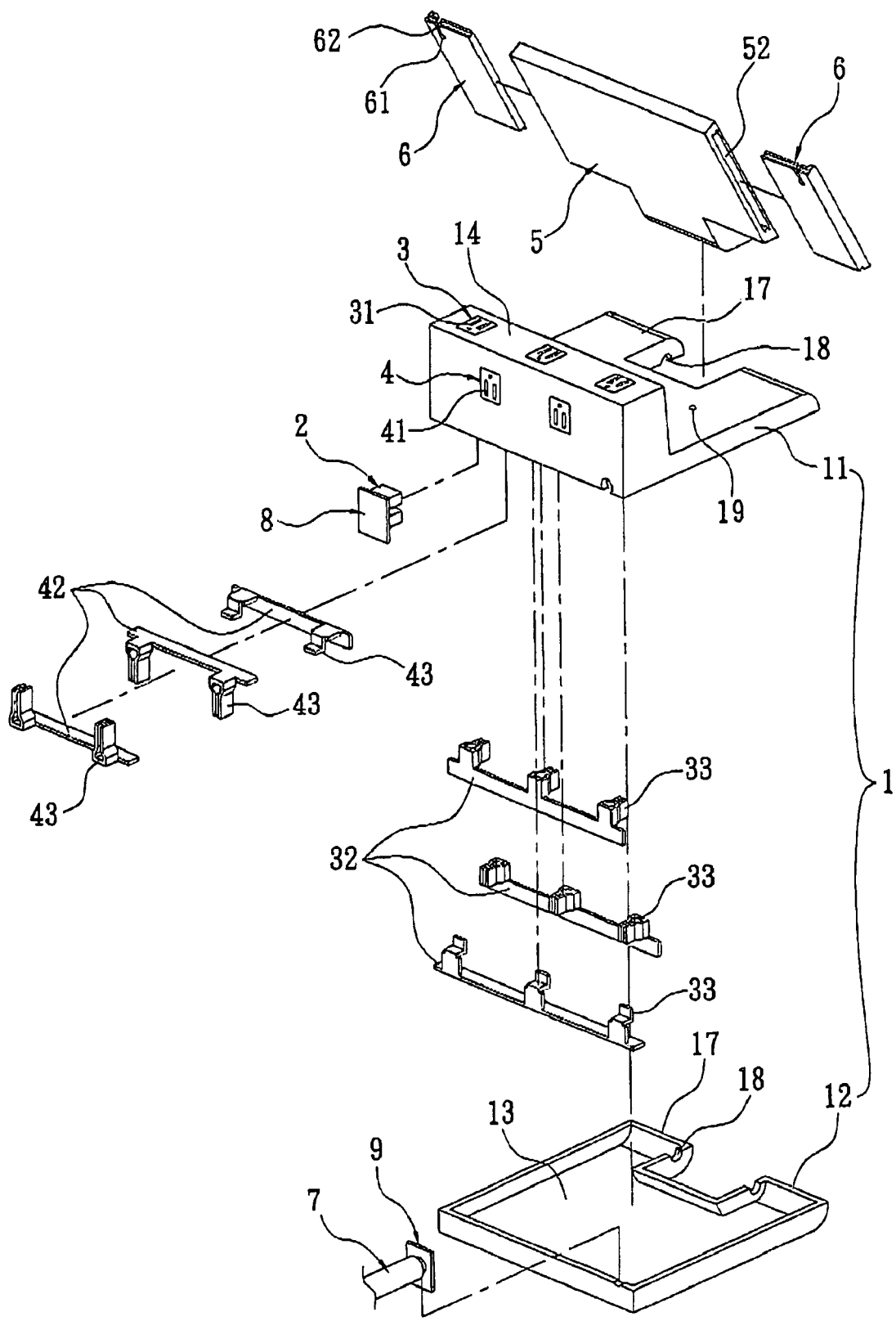
FIG. 2 is another exploded perspective view of the charging and power-supply device of the present invention.
Figure 3:
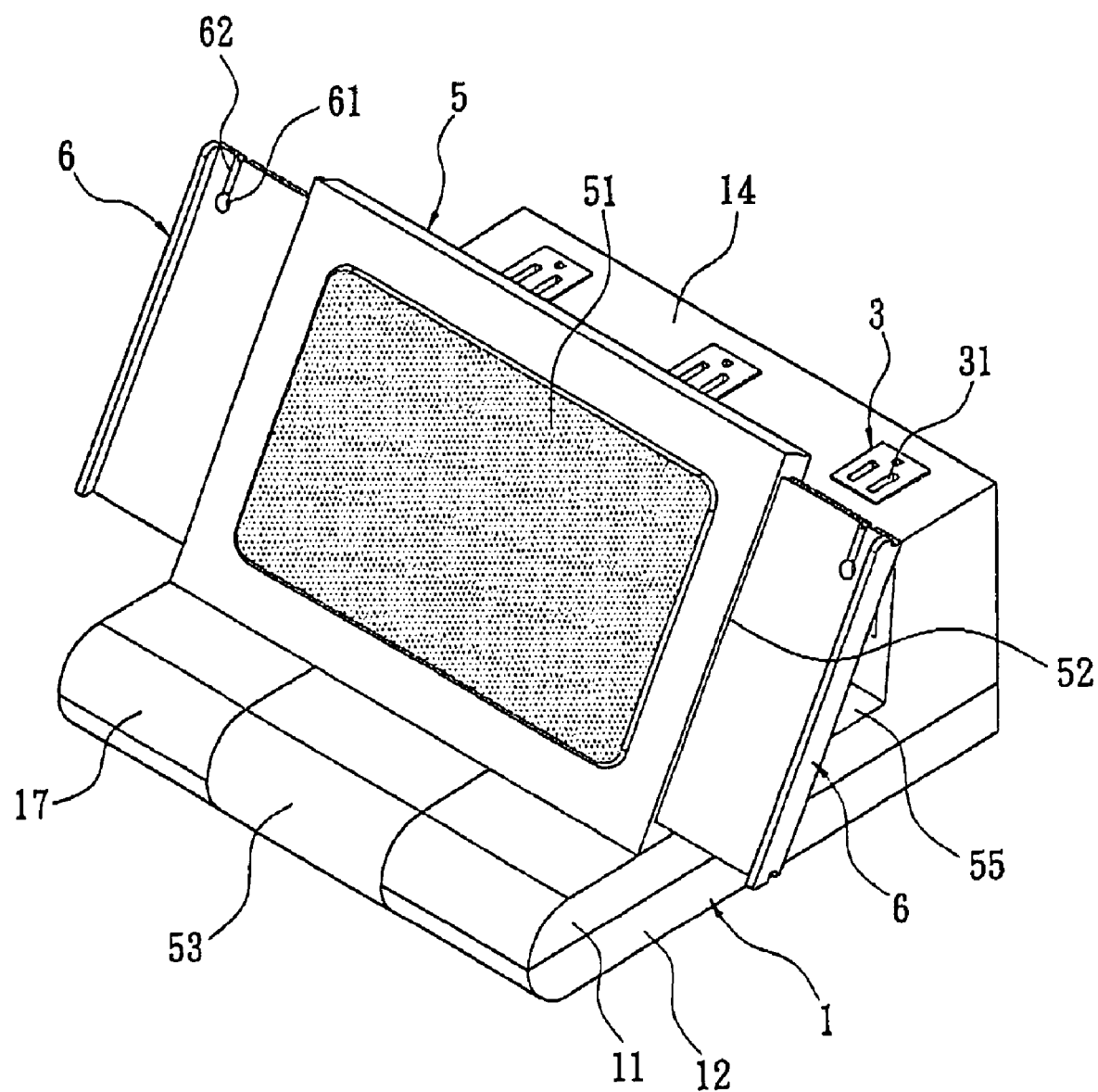
FIG. 3 is a perspective view of the charging and power-supply device of the present invention.

Reference is made to FIGS. 1~3. The charging and power-supply device includes a base 1, two first power sockets 2, three second power sockets 3, two third power sockets 4, a board 5, two expanding board 6, and a conductive wire 7. The base 1 includes an upper shell 11, and a lower shell 12. The upper shell 11 and the lower shell 12 are combined into one piece via a wedging method, a screwing method, or a supersonic method to form the hollow base 1. In an interior of the base 1, there is a receiving space 13.

A receiving portion 14 protrudes upwards from the top surface of the base that is adjacent to the rear side. In this embodiment the receiving portion 14 is a rectangular hollow block. It protrudes from the top surface at a proper distance. There are two openings 15 at the front side of the receiving portion 14. At the left side and the right side that are close to the front side of the base, there is a first pivoting portion 17. On the inner side of the first pivoting portion 17, there is a shaft hole 18. On the top surface of the base 1, there is a plurality of fixing holes 19 for being plugged with the wire-fastener.

In this embodiment, the two first power sockets 2 are USB sockets. The two first power sockets 2 are fastened on a first circuit board 8, and the two first power sockets 2 are electrically connected with the first circuit board 8. The first circuit board 8 is received in the receiving space 13 and the receiving portion 14. The first circuit board 8 is electrically connected with the conductive wire 7, and has a charging circuit. The two first power sockets 2 are received in the two openings 15, and are exposed to the front side of the receiving portion 14. When the plug of the portable device is plugged into the first power socket 2, the portable device is electrically connected with the conductive wire 7 via the first power socket 2 and the first circuit board 8 so that electrical power is delivered to the first power socket 2 through the conductive wire 7 and the first circuit board 8. Thereby, the portable device plugged with the first power socket 2 acquires required power.

The second power socket 3 includes a plurality of plugging holes 31 and a plurality of conductive flakes 32. The plugging holes 31 are located on the top of the receiving portion 14. The format and the type of the plugging holes 31 are not limited to a specific one. The conductive flakes 32 are made of conductive materials, such as copper. On the conductive flakes 32, there is a plurality of contacting portions 33 that correspond to the plugging holes 31 for electrically connecting with the plugging pins of the plug. The conductive flakes 32 are electrically connected with a second circuit board 9, and the second circuit board 9 is electrically connected with the conductive wire 7. When the plug of the portable device is plugged into the plugging holes 31, the portable device is electrically connected with the conductive wire 7 via the conductive flakes 32 and the second circuit board 9 so that electrical power is delivered to the conductive flakes 32 through the conductive wire 7 and the second circuit board 9. Thereby, the portable device plugged with the second power socket 3 acquires required power.

The third power socket 4 includes a plurality of plugging holes 41 and a plurality of conductive flakes 42. The plugging holes 41 are located on the rear side of the receiving portion 14. The format and the type of the plugging holes 41 are not limited to a specific one. The conductive flakes 42 are made of conductive materials, such as copper. On the conductive flakes 42, there is a plurality of contacting portions 43 that correspond to the plugging holes 41 for electrically connecting with the plugging pins of the plug. The conductive flakes 42 are electrically connected with a second circuit board 9. When the plug of the portable device is plugged into the plugging holes 41, the portable device is electrically connected with the conductive wire 7 via the conductive flakes 42 and the second circuit board 9 so that electrical power is delivered to the conductive flakes 42 through the conductive wire 7 and the second circuit board 9. Thereby, the portable device plugged with the third power socket 4 acquires required power. On the second circuit board 9, there is a surge protecting circuit (not shown in the figure). The surge protecting circuit forms a surge protecting algorithm to prevent surges from causing damage to the portable device.

The board 5 is a slim flat board. There is an anti-slide pad 51 pasted on the front surface of the board 5 for preventing the portable device from sliding when the portable device is placed on the board 5. At the left and right sides, there is an expanding slot 52. The two expanding boards 6 are movably and slidably connected with the two expanding slots 52. On the upper side of the expanding board 6 that is close to the corner, there is a through hole 61. On the upper edge of the through hole 61, there is a cross-sectional ditch 62. The cross-sectional ditch 62 extends to the upper side of the expanding board 6. The through hole 61 and the cross-sectional ditch 62 form an opening at the corner of the upper side of the expanding board 6. A key or a ring object can be hung in the opening, or a pen-shaped object can be plugged into this opening. A second pivoting portion 53 protrudes from the lower side of the board 5. On two sides of the pivoting portion 53, there is a rotating shaft 54. The two rotating shafts 54 rotatably fit with the two shaft holes 18 so that the board is pivoted with the base 1 via the pivoting unit that is composed of the first pivoting portion 17, the shaft hole 18, the second pivoting portion 53, and the rotating shaft 54. When the board 5 is rotated above the base 1, the board 5 utilizes the second pivoting portion 53 of the pivoting unit to be supported on the base 1 and form a slope. Of course, the board 5 also can be supported on the base 1 and form a slope by other methods.

The charging and power-supply device can be placed on a table, and the board 5 is rotated above the base 1 to support the board 5 on the base 1 and form a slope by the pivoting unit (as shown in FIG. 3). It is convenient to place portable devices, such as laptops, cell phones, and MP3 players, etc, on the board 5. The plug of the portable device is plugged with the first power socket 2, the second power socket 3, or the third power socket 4 to charge the portable device and provide surge protection.

When the space of the board 5 is not enough, the expanding boards 6 are pulled out from two sides of the board 5 to increase the space. When the board 5 is on a slope, there is a receiving space 55 formed between the board 5 and the base 1 for receiving the wire of the portable device.

Figure 4:
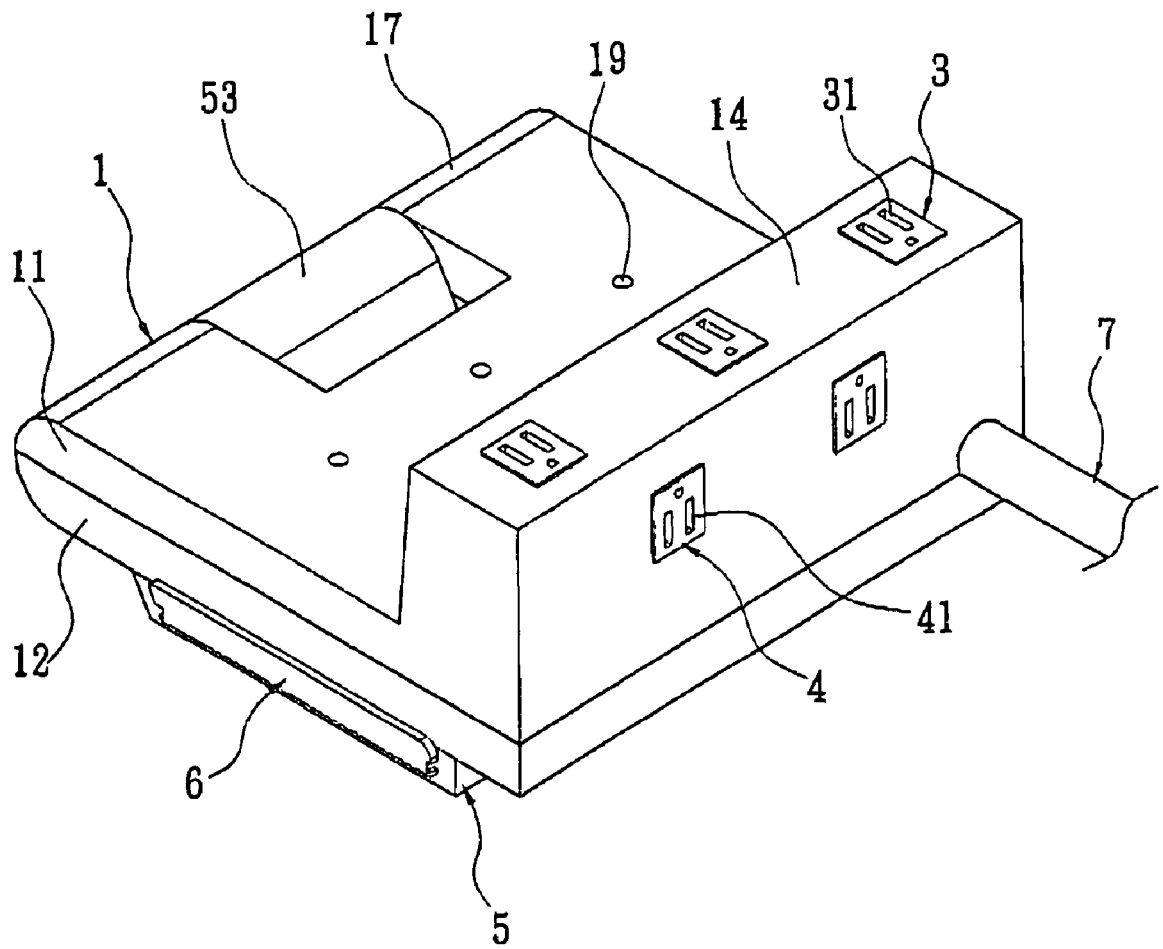
FIG. 4 is a perspective view of the charging and power-supply device of the present invention in another usage status.

Furthermore, the board 5 also can be rotated below the base 1 so that the board 5 is stacked and received under the base (as shown in FIG. 4) reducing the occupied space when the charging and power-supply device is shipped or packaged. Alternatively, the board 5 can be placed on the base 1 (not shown in the figure) by a plugging method or a pulling method to be on a slope. When the board 5 is not being used, the board 5 is stacked and placed above or below the base 1. The combining method between the board 5 and the base 1 is not limited to a specific one.

The second power socket 3 and the third power socket 4 are located at the upper side and rear side of the rear portion of the base 1 to shorten the distance between the second power socket 3 and the third power socket 4 and prevent the plugs or transformers from interfering with each other.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A charging apparatus for a portable device, comprising:
 a base;
 at least one power socket located on the base;
 a board rotatably connected to the base; and
 a conductive wire electrically connected with the power socket;
 wherein, when the board is rotated above the base, the board is inclined to the base, and there is a first receiving space formed between the board and the base whereby the portable device is removably mounted on the board and the base, when the board is rotated under the base, the board is stacked under a bottom of the base.

2. The charging apparatus as claimed in claim 1, wherein the base includes an upper shell, and a lower shell, the upper shell and the lower shell are combined into one piece.

3. The charging apparatus as claimed in claim 1, wherein there is a plurality of fixing holes for wire-fasteners on a top surface of the base.

4. The charging apparatus as claimed in claim 1, wherein the base includes at least one receiving portion, and the receiving portion protrudes from a top surface of the base that is close to the rear side.

5. The charging apparatus as claimed in claim 4, wherein there is a second receiving space in an interior of the base, an opening is located on the front side of the receiving portion, the power socket is a first power socket, the first power socket is electrically connected with a first circuit board, the first circuit board is electrically connected with the conductive wire, the first circuit board is received in the second receiving space, and the first power socket is received in the opening.

6. The charging apparatus as claimed in claim 5, wherein the first power socket is a USB socket, and the first circuit board has a charging circuit.

7. The charging apparatus as claimed in claim 4, wherein the power socket is a second power socket, the second power socket includes a plurality of plugging holes and a plurality of conductive flakes, the plugging holes is located on top of the receiving portion, the conductive flakes have a plurality of contacting portions that correspond to the plugging holes, the conductive flakes are electrically connected with a second circuit board, the second circuit board is electrically connected with the conductive wire, and the second circuit board has a surge protection circuit.

8. The charging apparatus as claimed in claim 4, wherein the power socket is a third power socket, the third power socket includes a plurality of plugging holes and a plurality of conductive flakes, the plugging holes are located on a rear side of the receiving portion, the conductive flakes have a plurality of contacting portions that correspond to the plugging holes, and the conductive flakes are electrically connected with the conductive wire.

9. The charging apparatus as claimed in claim 1, wherein a first pivoting portion is located on the front side of the base, the first pivoting portion has a shaft hole, a second pivoting portion is located on the lower side of the board, the second pivoting portion has a rotating shaft, the rotating shaft rotatably fits with the shaft hole, and the first pivoting portion, the shaft hole, the second pivoting portion, and the rotating shaft form a pivoting unit.

10. The charging apparatus as claimed in claim 9, wherein the board is supported by the pivoting unit to be on a slope.

11. The charging apparatus as claimed in claim 1, wherein an anti-sliding pad is pasted on the front surface of the board.

12. The charging apparatus as claimed in claim 1, wherein two sides of the board respectively have an expanding slot, the two expanding slots are movably and slidably connected with two expanding boards, a through hole is located on the upper side of the expanding board that is close to the corner, a cross-sectional ditch is located on the upper edge of the through hole, and the cross-sectional ditch extends to an upper side of the expanding board.

13. A charging apparatus for a portable device, comprising:
a base;
a first pivoting portion located on the front side of the base, the first pivoting portion having a shaft hole;
at least one power socket located on the base;
a board located on the base;
a second pivoting portion located on the lower side of the board, the second pivoting portion having a rotating shaft, the rotating shaft rotatably fitting with the shaft hole, wherein the first pivoting portion, the shaft hole, the second pivoting portion, and the rotating shaft form a pivoting unit; and
a conductive wire electrically connected with the power socket;
wherein, when the board is placed above the base, the board is on a slope, and there is a receiving space formed between the board and the base, when the board is not being used, the board is stacked onto the base.

* * * * *